(12) United States Patent
Adams et al.

(10) Patent No.: US 7,796,979 B2
(45) Date of Patent: *Sep. 14, 2010

(54) CONTROLLING VISIBILITY OF A WIRELESS DEVICE

(75) Inventors: Neil Adams, Waterloo (CA); Herbert Little, Waterloo (CA); Michael K. Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 809 days.

This patent is subject to a terminal disclaimer.

(21) Appl. No.: 11/218,608

(22) Filed: Sep. 6, 2005

(65) Prior Publication Data

US 2007/0053313 A1    Mar. 8, 2007

(51) Int. Cl.
*H04M 3/00*   (2006.01)

(52) U.S. Cl. .................. 455/418; 455/419; 455/567

(58) Field of Classification Search ................ 455/418, 455/419, 567
See application file for complete search history.

(56) References Cited

U.S. PATENT DOCUMENTS

| 5,440,559 | A | 8/1995 | Gaskill |
| 6,748,195 | B1 | 6/2004 | Phillips |
| 6,879,810 | B2 | 4/2005 | Bouet |
| 6,950,645 | B1 | 9/2005 | Kammer et al. |
| 2002/0077139 | A1 | 6/2002 | Bouet |
| 2002/0123325 | A1 | 9/2002 | Cooper |
| 2002/0188863 | A1 | 12/2002 | Friedman |
| 2002/0197956 | A1 | 12/2002 | Annola et al. |
| 2003/0100315 | A1 | 5/2003 | Rankin |
| 2003/0114107 | A1* | 6/2003 | Aoyagi ............... 455/41 |
| 2003/0183691 | A1 | 10/2003 | Lahteenmaki et al. |
| 2003/0228842 | A1 | 12/2003 | Heinonen et al. |
| 2004/0142691 | A1 | 7/2004 | Jollota et al. |
| 2004/0192207 | A1 | 9/2004 | Ketola |
| 2004/0203384 | A1 | 10/2004 | Sugikawa et al. |
| 2004/0224723 | A1 | 11/2004 | Farcasiu |
| 2004/0266350 | A1 | 12/2004 | Kim |
| 2005/0020207 | A1 | 1/2005 | Hamada et al. |
| 2005/0113137 | A1 | 5/2005 | Rodriguez et al. |
| 2006/0035631 | A1 | 2/2006 | White et al. |
| 2006/0128305 | A1 | 6/2006 | Delalat |
| 2006/0198448 | A1 | 9/2006 | Aissi et al. |
| 2006/0199537 | A1 | 9/2006 | Eisenbach |

(Continued)

FOREIGN PATENT DOCUMENTS

EP    1255383    11/2002

(Continued)

OTHER PUBLICATIONS

Extended European Search Report for EP05108130.5, Feb. 14, 2006.

(Continued)

*Primary Examiner*—Lester Kincaid
*Assistant Examiner*—Sayed T Zewari
(74) *Attorney, Agent, or Firm*—Integral Intellectual Property Inc.; Miriam Paton

(57) ABSTRACT

A first wireless device controls its visibility by disabling its discoverable mode or modes upon ascertaining that a second wireless device does not require the first device to be in a discoverable mode in order to establish connections therebetween.

24 Claims, 4 Drawing Sheets

U.S. PATENT DOCUMENTS

2006/0236117 A1    10/2006    Lazaridis et al.
2006/0293028 A1    12/2006    Gadamsetty et al.
2007/0066307 A1    3/2007    Brown et al.

FOREIGN PATENT DOCUMENTS

EP    1416703    5/2004
WO    01039577    6/2001
WO    03021978    3/2003

OTHER PUBLICATIONS

Second Examination Report for EP05108130.5, May 3, 2007.
Third Examination Report for EP05108130.5, Sep. 22, 2008.
Translation of First Office Action for China Application No. 200610128136.6, Jul. 4, 2008.
Gryazin, E A. , "Service Discovery in Bluetooth", Helsinki University of Technology, Oct. 6, 2000, XP002311799.
Afshar, Kamran , First Office Action for U.S. Appl. No. 11/218,609, Apr. 21, 2008.
Afshar, Kamran , Second Office Action for U.S. Appl. No. 11/218,609, Oct. 23, 2008.
Frantzeskakis, D-P , Extended European Search Report for EP 05108131.3, Feb. 23, 2006.
Matar, G. , First Office Action for CA 2554325, Nov. 5, 2008.
Bluetooth Sig, "Bluetooth Core specifications 2.1 pp. 227 and 228", Jul. 26, 2007.
Syed, Camran , First Office Action for CA 2558936, Feb. 12, 2009.
Afshar, Kamran , First Office Action for U.S. Appl. No. 12/503,010, Oct. 27, 2009.

* cited by examiner

CONTROLLING VISIBILITY OF A WIRELESS DEVICE

BACKGROUND

Bluetooth® wireless technology provides an easy way for a wide range of Bluetooth® devices (BT devices) to communicate with each other and connect to the Internet without the need for wires, cables and connectors.

The Bluetooth® core specifications v1.1, published Feb. 22, 2001 by the Bluetooth® special interest group (SIG) and the Bluetooth® core specifications v1.2, published Nov. 5, 2003, provide various security procedures (pairing, authentication and encryption). An Authentication procedure is based on a challenge-response scheme. Successful calculation of the authentication response requires that two devices share a secret Link Key. This Link Key is created during a Pairing procedure. If at least one authentication has been performed, then encryption may be used.

The Bluetooth® v1.1 and v1.2 specifications include provisions for three discoverability modes: Non-Discoverable Mode, Limited Discoverable Mode and General Discoverable Mode. According to these specifications, a device is in one, and only one, discoverability mode at a time.

When a BT device is in Non-Discoverable Mode it does not respond to inquiry. A BT device is said to be discoverable when it is in Limited Discoverable Mode or General Discoverable Mode. Even when a BT device is discoverable, it may be unable to respond to inquiry due to other baseband activity. A BT device that does not respond to inquiry due to being in Non-Discoverable Mode or due to other baseband activity is called a silent device. In Limited Discoverable Mode, a BT device is visible to all other BT devices that are within range, but only for limited periods of time. In General Discoverable Mode, a BT device is visible to all other BT devices that are within range, continuously or for no specific condition.

Even when not discoverable, a BT device is visible to other BT devices and users that are familiar with its Bluetooth® device address. The Bluetooth® device address is a unique 48-bit device identifier, where three bytes of the address are assigned to a specific manufacturer by the Institute of Electrical and Electronics Engineers (IEEE), and the other three bytes are freely allocated by the manufacturer.

There are a greater number of security concerns when a BT device is discoverable. A non-exhaustive list of examples for the security concerns includes eavesdropping on the data transferred during the communication of two BT devices, and the ability to fully impersonate other BT devices.

Similar concerns may arise with devices compatible with other wireless communication protocols, a non-exhaustive list of examples for which includes ZigBee™, radio frequency identification (RFID), ultra wideband (UWB), IEEE 802.11, and various proprietary communication protocols.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
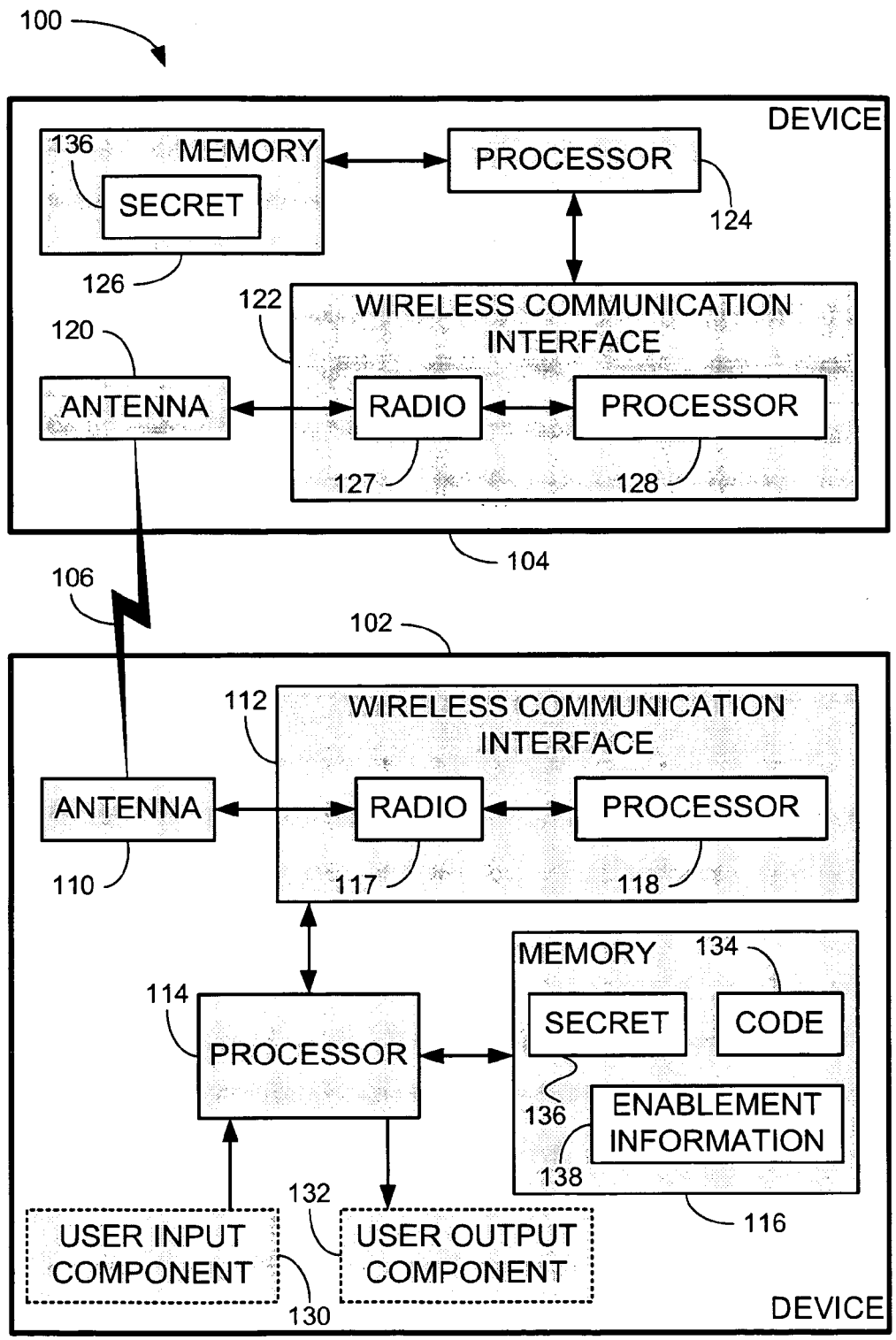
FIG. 1 is a block diagram of an exemplary communications system, according to some embodiments.

FIG. 1 is a block diagram of an exemplary communications system 100, according to some embodiments. System 100 comprises a device 102 and a device 104 able to communicate over a wireless communication link 106.

A non-exhaustive list of examples for devices 102 and 104 includes any of the following:

a) wireless human interface devices, for example, keyboards, mice, remote controllers, digital pens and the like;

b) wireless audio devices, for example, headsets, loudspeakers, microphones, cordless telephones, handsets, stereo headsets and the like;

c) wireless computerized devices, for example, notebook computers, laptop computers, desktop personal computers, personal digital assistants (PDAs), handheld computers, cellular telephones, MP3 players, printers, facsimile machines, and the like; and d) wireless communication adapters, for example, universal serial bus (USB) adapters, personal computer memory card international association (PCMCIA) cards, compact flash (CF) cards, mini peripheral component interconnect (PCI) cards, access points, and the like.

Device 102 may be manufactured to support one or more discoverable modes. For example, if device 102 is a BT device, device 102 may support Limited Discoverable Mode and/or General Discoverable Mode. Another device may have the property that it does not require device 102 to be in a discoverable mode in order to establish subsequent connections with device 102. For example, the other device may be able to establish subsequent connections with device 102 if the other device is provided with an identifier of device 102, for example a BT device address of device 102. If device 102 is able to ascertain this property about the other device, during or after having established an initial connection with this other device, device 102 may disable its one or more discoverable modes, thus controlling its visibility. While the one or more discoverable modes are disabled, device 102 is prevented from becoming discoverable, and devices that require device 102 to be discoverable in order to establish a connection therewith will not be able to detect device 102 when inquiring about devices within range.

Device 102 comprises an antenna 110, a wireless communication interface 112, a processor 114 coupled to wireless communication interface 112, and a memory 116 coupled to processor 114. Memory 116 may be fixed in or removable from device 102. Memory 116 may be embedded or partially embedded in processor 114. Processor 114 and memory 116 may be part of the same integrated circuit or in separate integrated circuits. Wireless communication interface 112 comprises a radio 117 coupled to antenna 110, and a processor 118 coupled to radio 117. Processor 118 may be able to cause device 102 to be in a discoverable mode. Wireless communication interface 112 and processor 114 may be part of the same integrated circuit or in separate integrated circuits.

Similarly, device 104 comprises an antenna 120, a wireless communication interface 122, a processor 124 coupled to wireless communication interface 122, and a memory 126 coupled to processor 124. Memory 126 may be fixed in or removable from device 104. Memory 126 may be embedded or partially embedded in processor 124. Processor 124 and memory 126 may be part of the same integrated circuit or in separate integrated circuits. Wireless communication interface 122 comprises a radio 127 coupled to antenna 120, and a processor 128 coupled to radio 127. Wireless communication interface 122 and processor 124 may be part of the same integrated circuit or in separate integrated circuits.

A non-exhaustive list of examples for antennae 110 and 120 includes dipole antennae, monopole antennae, multilayer ceramic antennae, planar inverted-F antennae, loop antennae, shot antennae, dual antennae, omnidirectional antennae and any other suitable antennae.

A non-exhaustive list of examples of communication protocols with which communication interfaces 112 and 122 may be compatible includes Bluetooth®, ZigBee™, radio frequency identification (RFID), ultra wideband (UWB), IEEE 802.11, and proprietary communication protocols.

A non-exhaustive list of examples for processors 114, 118, 124 and 128 includes a central processing unit (CPU), a digital signal processor (DSP), a reduced instruction set computer (RISC), a complex instruction set computer (CISC) and the like. Furthermore, processors 114, 118, 124 and 128 may be part of application specific integrated circuits (ASICs) or may be a part of application specific standard products (ASSPs).

A non-exhaustive list of examples for memories 116 and 126 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Device 102 may optionally comprise a user input component 130 coupled to processor 114. Input from user input component 130 may be interpreted by processor 114 as intended to result in device 102 being in a discoverable mode. Other and/or additional user input components are also possible. For example, processor 114 may interpret combinations of input as intended to result in device 102 being in a discoverable mode.

Device 102 may optionally comprise a user output component 132 coupled to processor 114. User output component 132 may be controlled by processor 114 to indicate to a user of device 102 that device 102 is actually in a discoverable mode and/or to indicate to the user that device is not actually in a discoverable mode.

Devices 102 and 104 may comprise additional components which are not shown in FIG. 1 and which, for clarity, are not described herein.

Figure 2:
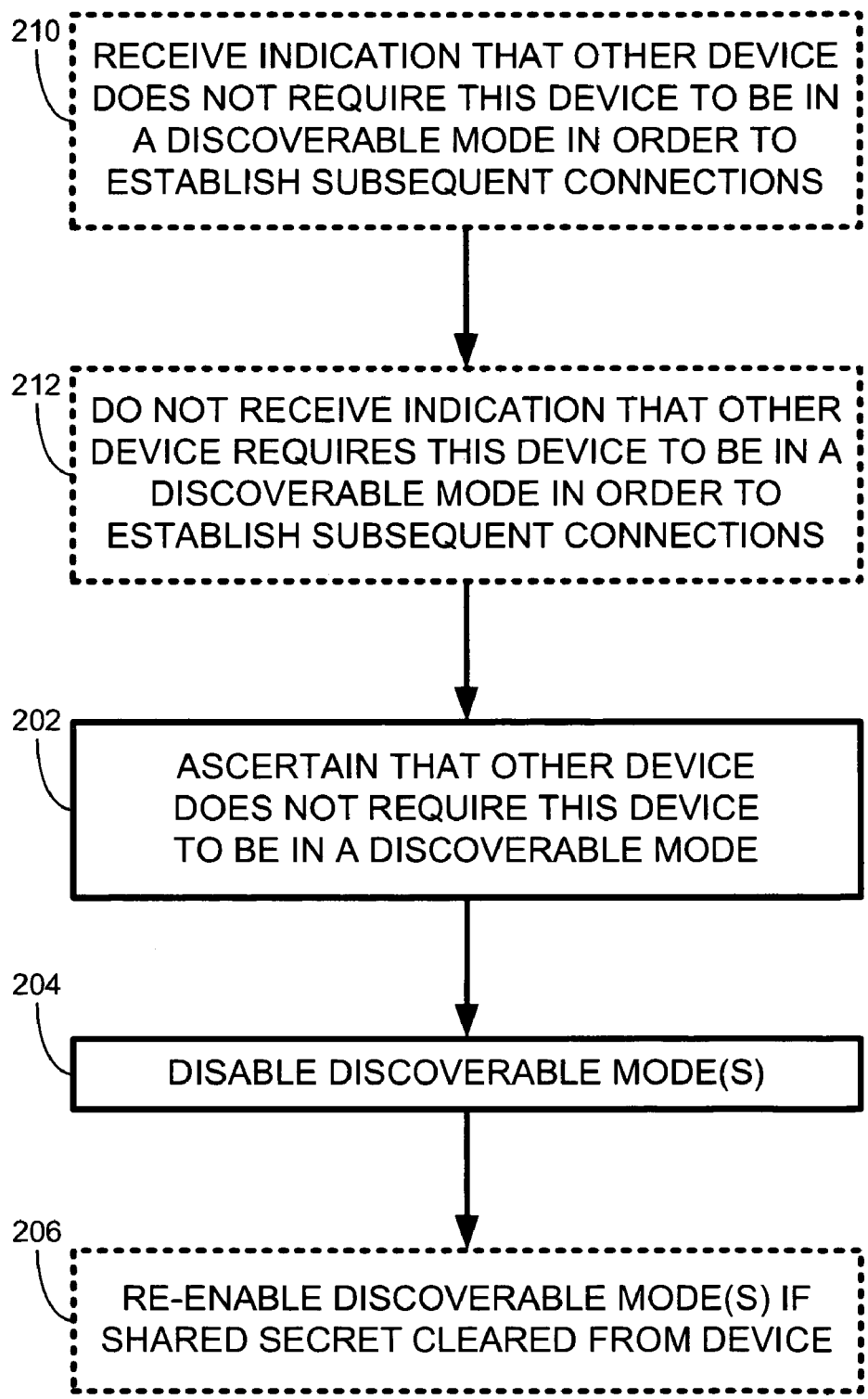
FIG. 2 is a flowchart of an exemplary method for controlling visibility of a wireless device, according to some embodiments.

FIG. 2 is a flowchart of an exemplary method for controlling visibility of a wireless device, according to some embodiments. Code 134 stored in memory 116 may implement the method of FIG. 2 in device 102.

At 202, device 102 ascertains that another device, for example, device 104, does not require device 102 to be in a discoverable mode in order to establish connections therewith.

At 204, device 102 disables its one or more discoverable modes. For example, device 102 may set an appropriate value in enablement information 138 stored in memory 116. The effect of disabling the one or more discoverable modes is described below with respect to FIG. 3.

Device 102 and device 104 may share a secret 136 that is used as a basis for a trusted relationship therebetween. Secret 136 is stored in memory 116 and in memory 126. For example, device 102 and device 104 may be paired BT devices and each store a common Link Key.

If at some point in time secret 136 is cleared from device 102, then at 206, device 102 may re-enable the one or more discoverable modes. In some embodiments, other conditions and/or additional conditions may need to be satisfied before device 102 re-enables the one or more discoverable modes.

In some embodiments, during or after having established an initial connection with device 104, device 102 may receive at 210 an indication that device 104 does not require device 102 to be in a discoverable mode in order to establish subsequent connections therebetween. Device 102 may therefore make the ascertainment at 202 based on having received such an indication.

In some embodiments, during or after having established an initial connection with device 104, device 102 may fail to receive at 212 any indication that device 104 does require device 102 to be in a discoverable mode in order to establish subsequent connections therebetween. Device 102 may therefore make the ascertainment at 202 based on the lack of having received any such indication.

Figure 3:
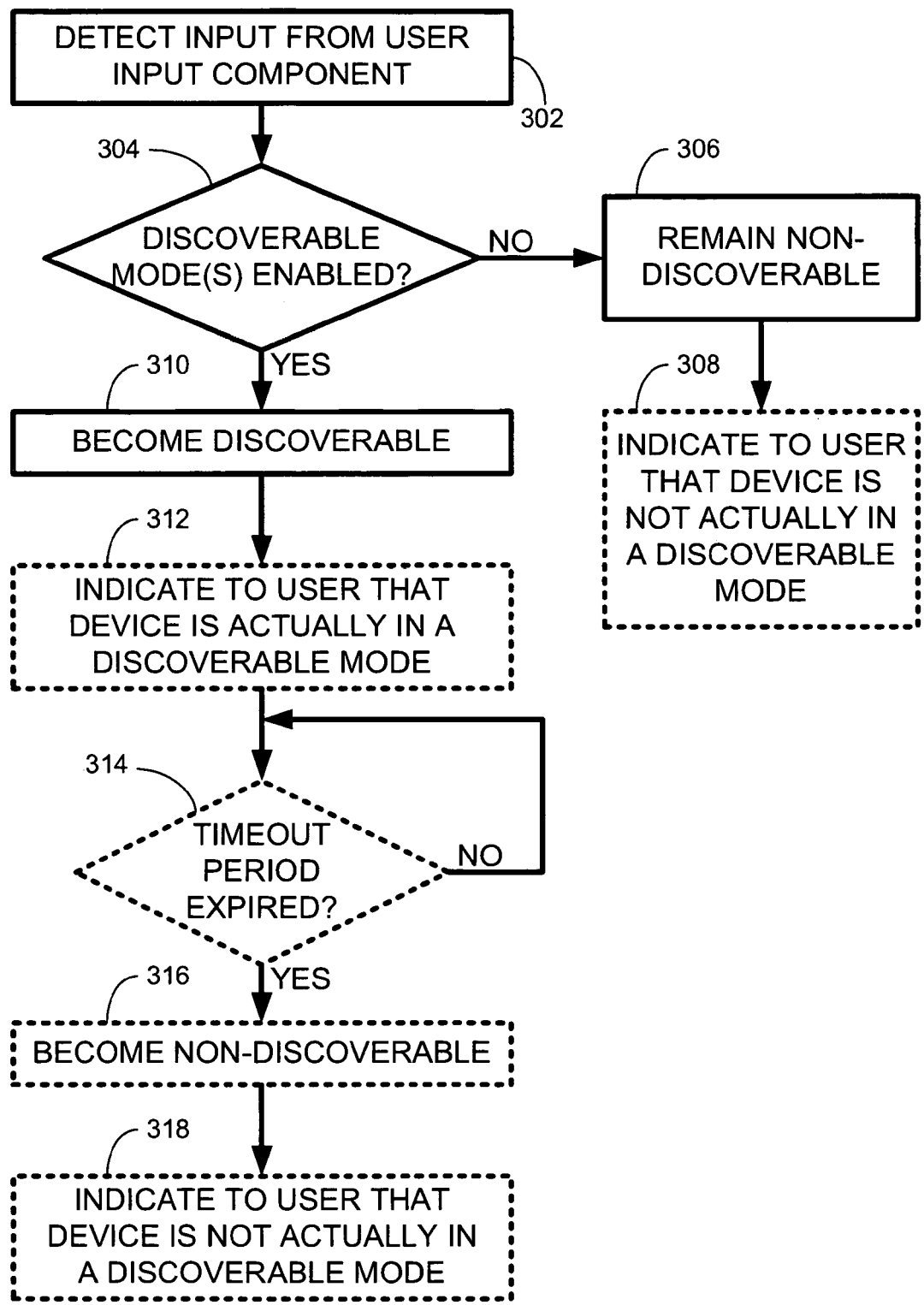
FIG. 3 is a flowchart of an exemplary method for reacting to input at a user input component of the wireless device, according to some embodiments.

FIG. 3 is a flowchart of an exemplary method for reacting to input at user input component 130, according to some embodiments.

At 302, user input component 130 detects input that is interpreted by processor 114 as intended to result in device 102 being in a discoverable mode. At 304, processor 114 checks whether the one or more discoverable modes are enabled. (Alternatively, processor 114 checks whether the one or more discoverable modes are disabled.) For example, processor 114 may check the value of enablement information 138 in order to determine whether the one or more discoverable modes are enabled or not.

If the one or more discoverable modes are disabled, then device 102 remains non-discoverable at 306, and in some embodiments, at 308, processor 114 controls user output component 132 to indicate to the user of device 102 that device 102 is not actually in a discoverable mode.

If the one or more discoverable modes are enabled, then device 102 becomes discoverable at 310, and in some embodiments, at 312, processor 114 controls user output component 132 to indicate to the user of device 102 that device 102 is actually in a discoverable mode.

Device 102 may support a discoverable mode that is limited in time, for example, Limited Discoverable Mode if device 102 is a BT device. For example, device 102 may become non-discoverable at 316 after a timeout period has expired (checked at 314). In one embodiment, the timeout period may be a predetermined timeout period that begins at the detection of the input at 302 or that begins at 310 when device 102 becomes discoverable. In another embodiment, the timeout period may be determined by the duration of the input detected at 302. For example, user input component 130 may be an electro-mechanical device such as a button, and if the discoverable mode is enabled, device 102 may become discoverable once the button is depressed and may become non-discoverable once the button is released. Other timeout periods are also possible.

In some embodiments, at 318, processor 114 may control user output component 132 to indicate to the user of device 102 that device 102 is not actually in a discoverable mode.

Figure 4:
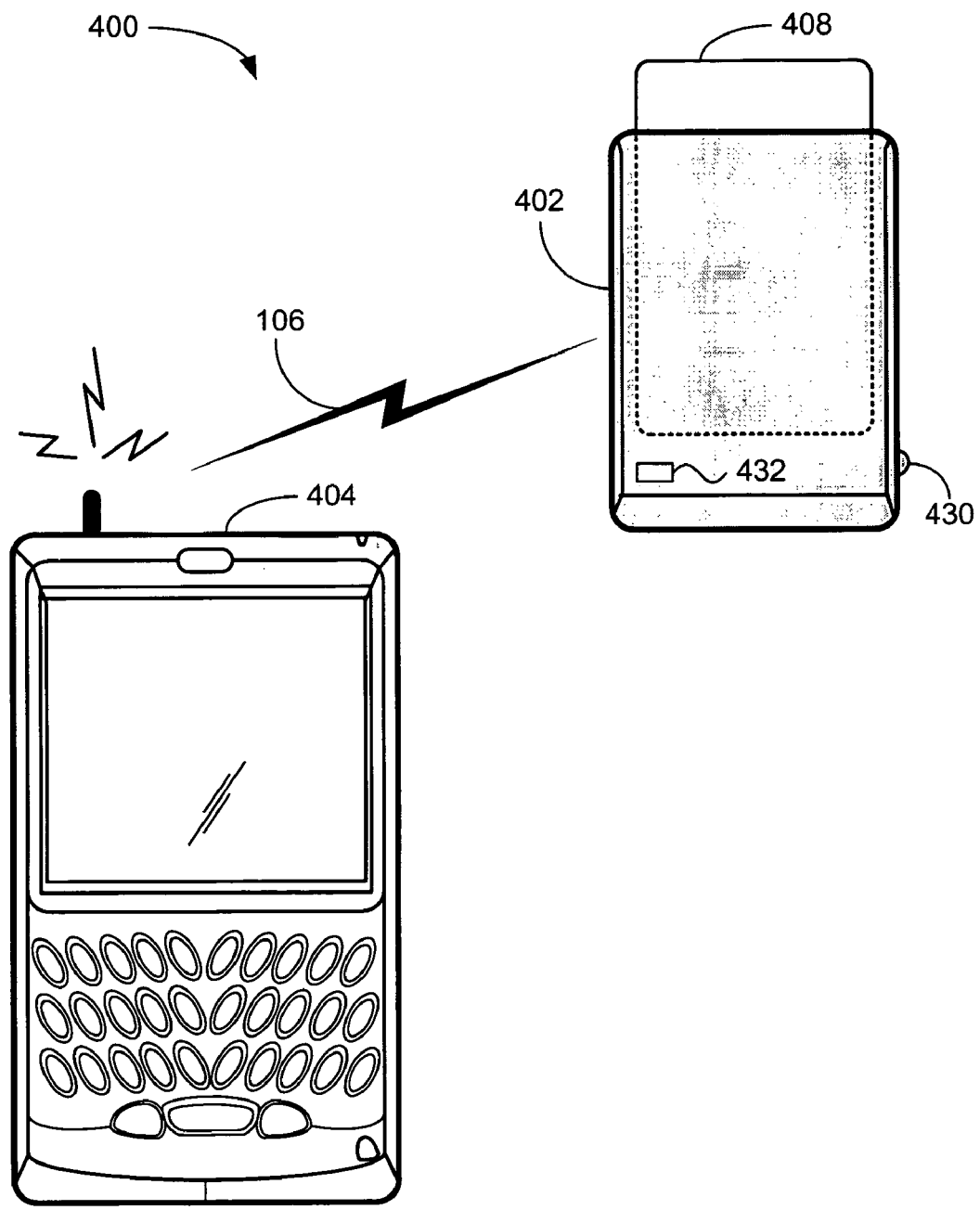
FIG. 4 is an illustration of an exemplary communications system, according to some embodiments.

FIG. 4 is an illustration of an exemplary communication system 400, according to some embodiments. System 400 is similar to system 100 of FIG. 1, where device 102 is a wireless smart card reader 402, and device 104 is a mobile device 404. Mobile device 404 and smart card reader 402 are able to communicate over wireless communication link 106. In the example shown in FIG. 4, user input component 130 is an electro-mechanical device 430, and user output component 132 is a light-emitting diode 432, however, other and/or additional user input and/or output components are possible.

A smart card 408 is shown inserted into smart card reader 402. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 408 may use smart card reader 402 for identification, to unlock mobile device 404, and to digitally sign and/or decrypt messages sent by mobile device 404. Smart card 408 may also include a random number generator.

For example, mobile device 404 may be able to send and receive e-mail messages via an e-mail server (not shown). If, for example, the Secure Multipurpose Internet Mail Extensions (S/MIME) protocol is used, e-mail messages received at mobile device 404 are encrypted using a symmetric algorithm with a random session key generated by the sender of the e-mail message. The e-mail message also includes the session key, encrypted using the public key of the recipient. Upon receipt of an encrypted e-mail message, mobile device 404 may extract the encrypted session key and send it to smart card reader 402 via communication link 106. Smart card reader 402 may send the encrypted session key to smart card 408, and the decryption engine of smart card 408 may decrypt the encrypted session key using the recipient's private decryption key, which is stored in smart card 408. Smart card reader 402 may retrieve the decrypted session key from smart card 408 and forward it to mobile device 404 via communication link 106 so that mobile device 404 can decrypt the received e-mail message. The smart card 408 may prevent unauthorized use of the recipient's private decryption key by requiring that a password or personal identification number (PIN) be supplied before allowing the decryption operation to proceed.

Similarly, to add a digital signature to an e-mail message being sent by mobile device 404, mobile device 404 may send a hash of the contents of the e-mail message to smart card reader 402 over communication link 106. Smart card reader 402 may pass the hash to smart card 408, which may produce a digital signature from the hash and the sender's private signing key, which is stored in smart card 408. Smart card 408 may then pass the digital signature to smart card reader 402, which may forward it to mobile device 404 via communication link 106 so that mobile device 404 can transmit it along with the e-mail message to the e-mail server. Again, smart card 408 may prevent unauthorized use of the recipient's private signing key by requiring that a password or PIN be supplied before allowing the signing operation to proceed.

The unencrypted message key should be sent securely over communication link 106 from smart card reader 402 to mobile device 404 to prevent a third party from retrieving the message key from communication link 106. Similarly, the hash to be signed should be sent authentically over communication link 106 from smart card reader 402 to mobile device 404 to prevent a third party from modifying the hash and thereby causing smart card 408 to produce a signature using a hash different from the hash of the intended message. Therefore communication link 106 may need to be secured using cryptographic techniques.

To secure communication link 106, smart card reader 402 may need to generate various cryptographic keys. For example, if smart card reader 402 and mobile device 102 are BT devices, then a relatively short (up to 16-digits) key may be used for the Pairing procedure. An additional layer of security for communication link 106 may involve encryption with one or more additional keys. These additional keys may be generated from a shared secret between smart card reader 402 and mobile device 404, and one or more symmetric keys based on this shared secret may be generated using known Diffie-Hellman and simple password exponential key exchange (SPEKE) methods and variants thereof. Moreover, random session keys may be generated for each individual communication session over communication link 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling visibility of a first wireless device, the method comprising:
   ascertaining that a second wireless device does not require said first device to be in a discoverable mode in order to establish connections therebetween;
   in response to said ascertaining, having said first wireless device disable said discoverable mode in said first wireless device; and
   when said discoverable mode is disabled in said first wireless device and input intended to result in said first wireless device being in said discoverable mode is detected, having said discoverable mode remain disabled in said first wireless device.

2. The method of claim 1, wherein said first wireless device is to ascertain that said second wireless device does not require said first wireless device to be in a discoverable mode in order to establish connections therebetween during or following establishment of an initial connection with said second wireless device.

3. The method of claim 1, further comprising:
having said first wireless device re-enable said discoverable mode in said first wireless device after a secret shared by said first wireless device and said second wireless device is cleared from said first wireless device.

4. The method of claim 3, wherein said secret is used as a basis for a trusted relationship between said first wireless device and said second wireless device.

5. The method of claim 1, further comprising:
receiving an indication that said second wireless device does not require said first wireless device to be in a discoverable mode in order to establish connections therebetween.

6. The method of claim 1, further comprising:
when said discoverable mode is disabled and said input is detected, having said first wireless device indicate to a user of said first wireless device that said first wireless device is not actually in said discoverable mode.

7. A first wireless device comprising:
a wireless communication interface able to cause said first wireless device to be in a discoverable mode;
a processor coupled to said wireless communication interface;
a user input component coupled to said processor; and
a memory coupled to said processor, said memory able to store enablement information and to store code which, when executed by said processor, disables said discoverable mode by setting said enablement information to a particular value in response to ascertaining that a second wireless device does not require said first wireless device to be in said discoverable mode in order to establish connections therebetween,
wherein said processor is able to interpret input from said user input component as intended to result in said first device being in said discoverable mode, and
wherein upon detection of said input, said processor is not to cause said first wireless device actually to be in a discoverable mode when said enablement information has been set to said particular value.

8. The first wireless device of claim 7, wherein said user input component is an electro-mechanical device.

9. The first wireless device of claim 7, further comprising:
a user output component coupled to said processor by which said processor is able to indicate to a user of said first device whether or not said first device is actually in discoverable mode.

10. The first wireless device of claim 7, wherein said memory is able to store a secret shared by said first wireless device and said second wireless device, and wherein said code, when executed by said processor, re-enables said discoverable mode after said secret is cleared from said memory.

11. The first wireless device of claim 10, wherein said secret is used as a basis for a trusted relationship between said first wireless device and said second wireless device.

12. The first wireless device of claim 7, wherein said first wireless device is a smart card reader.

13. The first wireless device of claim 7, wherein said wireless communication interface is compatible with Bluetooth® communication protocols.

14. The first wireless device of claim 7, wherein said wireless communication interface is compatible with ultra wideband (UWB) communication protocols.

15. The first wireless device of claim 7, wherein said wireless communication interface is compatible with ZigBee™ communication protocols.

16. The first wireless device of claim 7, wherein said wireless communication interface is compatible with radio frequency identification (RFID) communication protocols.

17. The first wireless device of claim 7, wherein said wireless communication interface is compatible with one or more IEEE 802.11 communication protocols.

18. A communications system comprising:
a first wireless device; and
a second wireless device,
wherein said first wireless device is able to disable a discoverable mode in said first wireless device in response to ascertaining that said second wireless device does not require said first wireless device to be in said discoverable mode in order to establish connections therebetween; and
wherein when said discoverable mode is disabled in said first wireless device and input intended to result in said first wireless device being in said discoverable mode is detected, said discoverable mode remains disabled in said first wireless device.

19. The communications system of claim 18, wherein said second wireless device is a smart card reader.

20. The communications system of claim 18, wherein said wireless communication protocol is a Bluetooth® communication protocol.

21. The communications system of claim 18, wherein said wireless communication protocol is an ultra wideband (UWB) communication protocol.

22. The communications system of claim 18, wherein said wireless communication protocol is a ZigBee™ communication protocol.

23. The communications system of claim 18, wherein said wireless communication protocol is a radio frequency identification (RFID) communication protocol.

24. The communications system of claim 18, wherein said wireless communication protocol is an IEEE 802.11 communication protocol.

* * * * *